(12) United States Patent
Ogino et al.

(10) Patent No.: US 9,103,443 B2
(45) Date of Patent: Aug. 11, 2015

(54) SEALING STRUCTURE FOR CYLINDRICAL BODY

(75) Inventors: Shinji Ogino, Mihara (JP); Shigeru Nishida, Mihara (JP); Haruaki Hirayama, Mihara (JP); Ken Shoji, Mihara (JP); Taiji Sato, Mihara (JP); Hiroshi Tsubone, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 222 days.

(21) Appl. No.: 13/255,215

(22) PCT Filed: May 27, 2009

(86) PCT No.: PCT/JP2009/059716
§ 371 (c)(1),
(2), (4) Date: Sep. 7, 2011

(87) PCT Pub. No.: WO2010/137141
PCT Pub. Date: Dec. 2, 2010

(65) Prior Publication Data
US 2012/0001420 A1    Jan. 5, 2012

(51) Int. Cl.
*F16L 39/00* (2006.01)
*F16J 15/06* (2006.01)
*F16J 15/02* (2006.01)
*B01D 63/06* (2006.01)
(Continued)

(52) U.S. Cl.
CPC .............. *F16J 15/062* (2013.01); *B01D 63/062* (2013.01); *B01D 65/003* (2013.01); *F16J 15/028* (2013.01); *B01D 71/02* (2013.01); *B01D 2313/04* (2013.01)

(58) Field of Classification Search
USPC ............................ 285/101, 108, 124.2, 124.3
See application file for complete search history.

(56) References Cited

U.S. PATENT DOCUMENTS

| 3,215,166 A | 11/1965 | Meinecke |
| 3,825,287 A * | 7/1974 | Erickson et al. ............ 285/124.3 |
| 5,979,499 A * | 11/1999 | Smith ....................... 137/614.04 |

FOREIGN PATENT DOCUMENTS

| EP | 1 965 117 A1 | 9/2008 |
| JP | 60-178071 U | 11/1985 |

(Continued)

OTHER PUBLICATIONS

International Search Report, dated Sep. 1, 2009 for PCT/JP2009/059716.

(Continued)

*Primary Examiner* — Daniel P Stodola
*Assistant Examiner* — Gwendolyn Driggers
(74) *Attorney, Agent, or Firm* — Westerman, Hattori, Daniels & Adrian, LLP

(57) ABSTRACT

A sealing structure for a cylindrical body has an O-ring holder in which a planar O-ring that provides a seal in the planar direction and a radial O-ring that provides a seal in the axial line direction of the cylindrical body are incorporated in the crossing direction provided at both end parts of the cylindrical body; a pressing means for pressing the O-ring holder in the axial line direction of the cylindrical body via a pressing lid; the O-ring holder is pressed against a tube sheet of the fluid chamber via the pressing lid by the pressing means to press the planar O-ring onto the tube sheet, whereby a fluid tight seal is provided between the fluid chamber and the outside; and the radial O-ring is pressed onto the outer periphery of the cylindrical body to provide a fluid tight seal between the fluid passage and the fluid chamber.

1 Claim, 6 Drawing Sheets

(51) Int. Cl.
  *B01D 65/00* (2006.01)
  *B01D 71/02* (2006.01)

(56) References Cited

FOREIGN PATENT DOCUMENTS

| JP | 52-60696 U | 5/1997 |
| JP | 2000-240853 A | 9/2000 |
| JP | 2004-89882 A | 3/2004 |
| JP | 2004-89883 A | 3/2004 |

OTHER PUBLICATIONS

Notice of Allowance dated Mar. 22, 2013, issued in corresponding Japanese Patent Application No. 2011-515797, with English Translation (6 pages).
Canadian Notice of Allowance dated Jul. 21, 2014, issued in corresponding Canadian Patent Application No. 2,757,211 (1 page).
Extended European Search Report dated Mar. 19, 2014, issued in corresponding European application No. 09845208.9 (7 pages).
European Notice of Allowance dated Apr. 8, 2015, issued in corresponding EP Patent Application No. 09845208.9 (25 pages).

* cited by examiner

FIG.5(A)
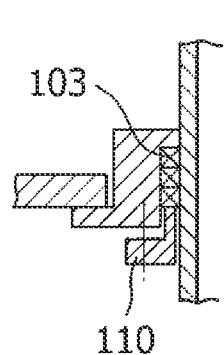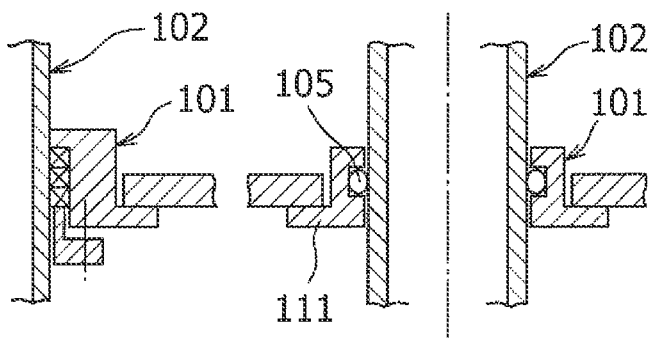
FIG.5(B)
FIG.5(C)
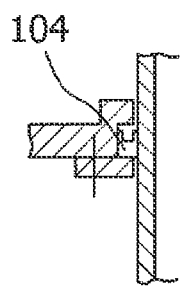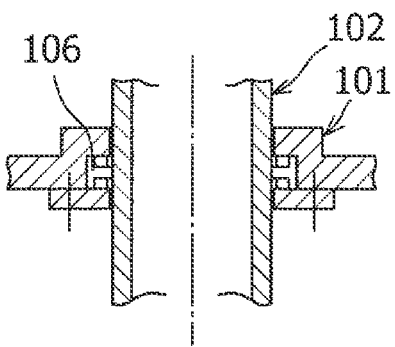
FIG.5(D)

SEALING STRUCTURE FOR CYLINDRICAL BODY

TECHNICAL FIELD

The present invention relates to a sealing structure for an end part of a cylindrical inorganic material or a cylindrical metal.

BACKGROUND ART

As a synthesis method of DME (dimethyl ether), for example, a method of producing DME and water due to dehydration reaction of ethanol is conventionally known.

In this synthesis method, the produced water and the produced DME increase as the reaction proceeds, and apparent reaction is ended when equilibrium composition is achieved at a reaction temperature. In order to increase the production amount of DME per the amount of the same crude methanol, in a conventional technique, after a gas from an exit of a reactor is cooled, the cooled gas is gas-liquid separated, and DME is recovered as a gas phase while produced water and unreacted methanol are recovered as a liquid phase. Furthermore, the recovered liquid phase is introduced into a distillation tower so that the liquid phase is separated into water and methanol by distillation, and the separated water is discharged outside the system while the separated methanol is circulated into the reactor.

Furthermore, for example, as a synthesis method of terephthalic acid, a method of producing terephthalic acid by par-axylene being subjected to an air oxidation reaction by using an oxidation catalyst under the existence of a solvent of aliphatic carboxylic acid such as acetic acid is common. In this synthesis method, as a result of producing water along with the oxidation reaction, in a conventional technique, an oxidized exhaust gas from an oxidation reactor or a condensate liquid of the oxidized exhaust gas and other solvent containing water generated in the system are introduced into a distillation tower so as to be distilled, and the reaction solvent is recovered by removing oxidized product water.

FIG. 4 is a sectional view showing a part of a separation membrane 110 for a conventional separation device.

In the separation device shown in FIG. 4, a fluid is introduced from below into a first chamber 111 in the cylindrical separation membrane 110 capable of allowing water to pass through in vapor form, and as the fluid rises, the water content in the fluid is moved into a depressurized second chamber 121 that accommodates the separation membrane 110, and the dehydrated fluid is discharged from the top of the first chamber 111.

In FIG. 4, the separation membrane 110 is held between the top part and the bottom part of the second chamber 121 via O-rings 130T and 130B.

Also, in the above-described dehydrating membrane separation device, in addition to the O-rings shown in FIG. 4, sealing means, for example, as shown in FIGS. 5(A) to 5(D), are provided. In FIGS. 5(A) to 5(D), reference numeral 101 denotes a part connecting with a shell body, and 102 denotes a cylindrical body forming the separation membrane.

In FIG. 5(A), a seal is provided by putting a grand packing 103 and pressing it by using a pressing member 110. In FIG. 5(B), a seal is provided by an O-ring 105 installed in an O-ring case 111. In FIG. 5(C), a seal is provided by installing a U-packing 104. In FIG. 5(D), a seal is provided by installing a T-ring 106.

One usage example of a separation membrane has been proposed in Patent Literature 1 (Japanese Unexamined Patent Application Publication No. 2004-89882) and Patent Literature 2 (Japanese Unexamined Patent Application Publication No. 2004-89883). These Publications disclose a technique in which a fluid is caused to flow in a membrane separation device having a separation membrane that allows water to permeate and extends in the vertical direction.

CITATION LIST

Patent Literature

[PTL 1]
Japanese Unexamined Patent Application Publication No. 2004-89882
[PTL 2]
Japanese Unexamined Patent Application Publication No. 2004-89883

SUMMARY OF INVENTION

Technical Problem

For the separation device shown in FIG. 4, as the size of separation membrane 110 increases, the reliability of holding the separation membrane 110 decreases in the case in which only the O-rings 130T and 130B in the top and bottom parts are used. In particular, when the pressure reduction of the second chamber 121 is released, the separation membrane 110 may come off the second chamber 121. Also, in the case in which the cylindrical separation membrane 110 is formed of an inorganic porous material or the like, the cross-sectional shape of the cylindrical separation membrane 110 is not a complete circle. Therefore, when the separation membrane 110 is held by the metallic second chamber 121 via the O-rings 130T and 130B, the pressing in the circumferential direction of the O-ring is not uniform, which presents a problem in terms of sealing ability.

Furthermore, for the sealing means shown in FIG. 4 and FIGS. 5(A) to 5(D), in the case in which the cylindrical separation membrane 110 is formed of an inorganic porous material or the like, the cylinder diameter inevitably varies between individual separation membranes. Therefore, for example, in the case in which the cylinder having a diameter of 50 mm has a tolerance of ±1 mm, if the sealing device is designed so as to have an average diameter, when the cylinder diameter is large, the sealing material is deformed excessively, and the service life thereof is thereby greatly shortened. In addition, when the cylinder diameter is small, a gap is produced, or the contact surface pressure decreases, and there is therefore the risk that the seal cannot be provided.

That is to say, the cylinder formed of an inorganic porous material or the like has a tolerance for not only diameter but also straightness (bending in the lengthwise direction). Since the cylinder also has the roundness tolerance, for the sealing structure, these tolerances must be considered.

The present invention was made in view of the above-described circumstances, and accordingly an object thereof is to provide a sealing structure for a cylindrical body provided in a shell body, in which the occurrence of a defective seal caused by the straightness tolerance, roundness tolerance, and diameter tolerance of the cylindrical body can be prevented, and the sealing ability can be improved by absorbing the variations in straightness, roundness, and diameter even if the variations exist.

Means for Solving the Problem

To solve the problems in the above-described related art, the present invention provides a sealing structure for a cylindrical body, in which a fluid chamber and a cylindrical body arranged on the inside of the fluid chamber are provided in a shell body; a fluid passage is formed in the cylindrical body; and both end parts of the cylindrical body are sealed in a fluidtight manner, wherein an O-ring holder in which a planar O-ring that provides a seal in the planar direction and a radial O-ring that provides a seal in the axial line direction of the cylindrical body are incorporated in the crossing direction is provided at both end parts of the cylindrical body; a pressing means for pressing the O-ring holder in the axial line direction of the cylindrical body via a pressing plate; the O-ring holder is pressed against a tube sheet of the fluid chamber via the pressing plate by the pressing means to press the planar O-ring onto the tube sheet, whereby a fluidtight seal is provided between the fluid chamber and the outside; and the radial O-ring is pressed onto the outer periphery of the cylindrical body to provide a fluidtight seal between the fluid passage in the cylindrical body and the fluid chamber.

Solution to Problem

Also, in particular, the present invention is preferably configured as follows:
(1) A gap that allows the O-ring holder to move in the horizontal direction is formed between the outer peripheral wall of the planar O-ring of the O-ring holder and the tube sheet.
(2) A groove having a triangular shape is provided at the inner periphery of the O-ring holder and the radial O-ring is incorporated in the groove and pressed by an O-ring pressing member, whereby a seal is provided between the O-ring holder and the outer periphery of the cylindrical body; and a shim member is provided between the O-ring holder and the O-ring pressing member and is configured in such a manner that the thickness of the shim member is adjustable so that the radial O-ring in the groove having a triangular shape has a predetermined compression amount via the O-ring pressing member.
(3) A cross-shaped member is fixed to the pressing plate and is brought into contact with the end part of the cylindrical member, whereby the cross-shaped member is configured so as to be brought into contact with the lower end of the cylindrical member by the pressing means, and a gap is provided between the cross-shaped member and the upper end of the cylindrical member.

Advantageous Effect of Invention

As described above, the sealing structure for a cylindrical body in accordance with the present invention is configured so that a fluid chamber and a cylindrical body arranged on the inside of the fluid chamber are provided in a shell body; a fluid passage is formed in the cylindrical body; and both end parts of the cylindrical body are sealed in a fluidtight manner, in which an O-ring holder in which a planar O-ring that provides a seal in the planar direction and a radial O-ring that provides a seal in the axial line direction of the cylindrical body are incorporated in the crossing direction is provided at both end parts of the cylindrical body; a pressing means for pressing the O-ring holder in the axial line direction of the cylindrical body via a pressing plate; the O-ring holder is pressed against a tube sheet of the fluid chamber via the pressing plate by the pressing means to press the planar O-ring onto the tube sheet, whereby a fluidtight seal is provided between the fluid chamber and the outside; and the radial O-ring is pressed onto the outer periphery of the cylindrical body to provide a fluidtight seal between the fluid passage in the cylindrical body and the fluid chamber. Specifically, a gap that allows the O-ring holder to move in the horizontal direction is formed between the outer peripheral wall of the planar O-ring of the O-ring holder and the tube sheet. Also, a groove having a triangular shape is provided at the inner periphery of the O-ring holder and the radial O-ring is incorporated in the groove and is pressed by an O-ring pressing member, whereby a seal is provided between the O-ring holder and the outer periphery of the cylindrical body; and a shim member is provided between the O-ring holder and the O-ring pressing member and is configured in such a manner that the thickness of the shim member is adjustable so that the radial O-ring in the groove having a triangular shape has a predetermined compression amount via the O-ring pressing member even if the cylindrical body has a diameter tolerance.

Therefore, according to the present invention, for the cylindrical body formed of an inorganic porous material or the like, the gap that allows the O-ring holder to move in the horizontal direction is formed between the outer peripheral wall of the planar O-ring of the O-ring holder and the tube sheet to accommodate the tolerance of not only diameter but also straightness (bend in the lengthwise direction). Therefore, when the device is assembled, the O-ring holder is moved freely in the horizontal direction in the gap while the seal with the planar O-ring is maintained. Thereby, the bend in the lengthwise direction of the cylindrical body can be accommodated.

Also, the roundness tolerance of the cylindrical body can be accommodated by the elasticity of the radial O-ring that provides a seal in the axial line direction of the cylindrical body.

Furthermore, the tolerance in the lengthwise direction of the cylindrical body can be accommodated by providing a holding means that is in contact with the axial line direction of the cylindrical body via the pressing lid provided in the lower part and providing a gap in the upper part.

Also, the diameter tolerance of the cylindrical body is accommodated as described below. The groove having a triangular shape is provided at the inner periphery of the O-ring holder, and the radial O-ring is incorporated in the groove and is pressed by the O-ring pressing member, by which a seal is provided between the O-ring holder and the outer periphery of the cylindrical body. Furthermore, the shim member is provided between the O-ring holder and the O-ring pressing member, and the configuration is made such that the thickness of the shim member is adjusted so that the radial O-ring in the groove having a triangular shape has the predetermined compression amount via the O-ring pressing member. Therefore, the diameter tolerance of the cylindrical body can be accommodated by holding the shape of the groove having a triangular shape so as to be the same according to the diameter tolerance of the cylindrical body by the adjustment of the thickness of the shim member and by holding the predetermined compression amount of the radial O-ring so as to be constant.

Furthermore, the O-ring holder, the O-ring pressing member, and the shim member can be assembled and disassembled as a unit, and the assembling work and the disassembling work are thereby easy.

Also, since the cross-shaped member is fixed to the pressing lid and is brought into contact with the end part of the cylindrical member, whereby the cross-shaped member is configured so as to be brought into contact with the end part of the cylindrical member by the pressing means, the cylindrical body can be held by the cross-shaped member and the pressing lid.

BRIEF DESCRIPTION OF DRAWINGS

FIGS. 5(A) to 5(D) are sectional views showing examples of conventional sealing means.

DESCRIPTION OF EMBODIMENT

A sealing structure for a cylindrical body in accordance with an embodiment of the present invention will now be described in detail with reference to the accompanying drawings.

Figure 1:
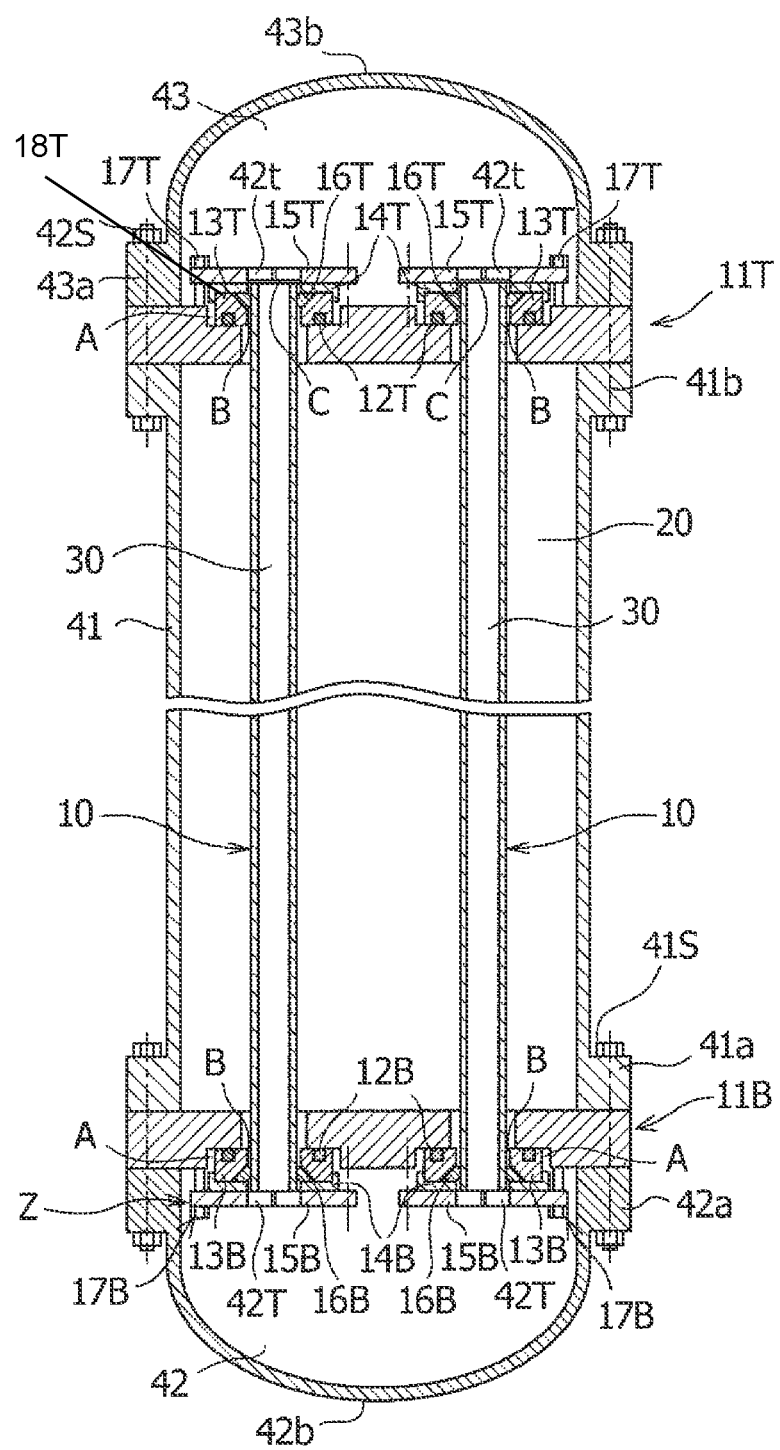
FIG. 1 is a sectional view of a portion of a separation device in accordance with an embodiment of the present invention.
Figure 2:
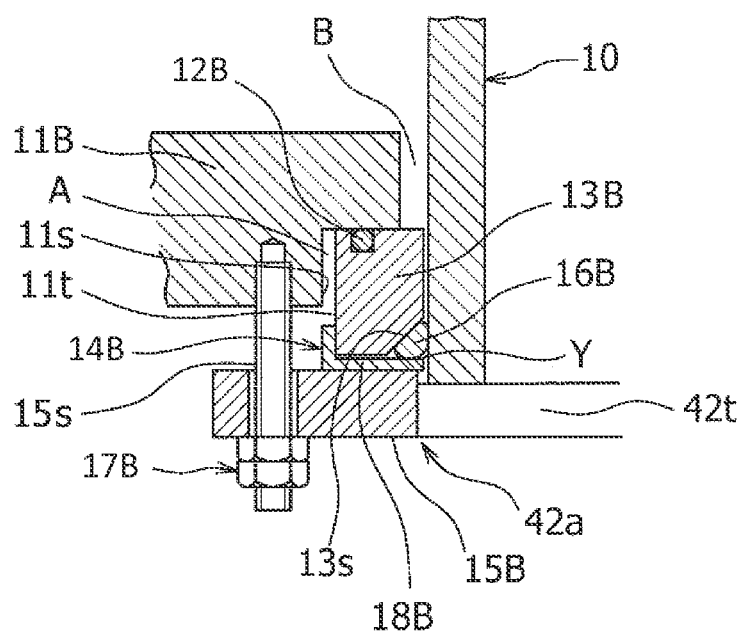
FIG. 2 is an enlarged view of a portion Z of FIG. 1.

FIG. 1 is a sectional view of an essential portion of a separation device in accordance with an embodiment of the present invention, and FIG. 2 is an enlarged view of a portion Z of FIG. 1.

In the separation device in accordance with this embodiment, as a treated fluid to be dehydrated, a methanol aqueous solution or a solvent of aliphatic carboxylic acid such as acetic acid is assumed.

As shown in FIGS. 1 and 2, the above-described separation device includes a longitudinally mounted cylindrical body 10 and a shell body 41. Two cylindrical bodies 10 are arranged side by side with a space therebetween in a planar direction in the shell body 41, and a second chamber (fluid chamber) 20 is formed between the outer periphery of the cylindrical body 10 and the inner periphery of the shell body 41. In the cylindrical body 10, a first chamber (fluid passage) 30 is formed.

In the bottom part and the top part of the shell body 41, a flange 41a and a flange 41b are provided, respectively. Also, on the bottom side of the bottom flange 41a, a bottom tube sheet 11B is provided, and on the top side of the top flange 41b, a top tube sheet 11T is provided. Furthermore, on the lowermost side of the shell body 41, a bottom chamber 42 is provided. The bottom chamber 42 is formed by a shell-shaped case 42b having a flange 42a. On the other hand, on the uppermost side of the shell body 41, a top chamber 43 is provided. The top chamber 43 is formed by a shell-shaped case 43b having a flange 43a.

The bottom tube sheet 11B is held between the flange 41a of the shell body 41 and the flange 42a of the bottom chamber 42, and these three elements are tightened with bolts 41s. Also, the top tube sheet 11T is held between the flange 41b of the shell body 41 and the flange 43a of the top chamber 43, and these three elements are tightened with bolts 42s. Thereby, the separation device is assembled.

In the description below, explanation is given of the lower left half (suffix B) of the separation device. The configuration of the upper right half is the same as that of the lower left half, and explanation of the upper right half is therefore omitted.

In FIG. 2, a groove 11s is formed in the lower part at the inner periphery of the bottom tube sheet 11B, and a ring-shaped O-ring holder 13B is insertedly arranged in the groove 11s. In the upper part and the lower part of the O-ring holder 13B, a planar O-ring 12B that provides a seal in the plane direction and a radial O-ring 16B that provides a seal in the axial line direction of the cylindrical body 10 are incorporated, respectively, in the right-angled direction.

Also, on the inner periphery side of the lower part of the O-ring holder 13B, a groove 13s having a triangular cross-sectional shape is provided. In the groove 13s, the radial O-ring 16B is incorporated, and it is pressed from below by an O-ring pressing member 14B. Therefore, the O-ring pressing member 14B is formed in such a manner that the outer part thereof is substantially of an L-shape in cross section so that the O-ring pressing member 14B is in contact with the outer peripheral surface and the lower surface of the O-ring holder 13B. Between the lower surface of the O-ring holder 13B and the upper surface of the O-ring pressing member 14B, a shim 18B is disposed. As described below in detail, the configuration is made such that the thickness of the shim 18B is adjustable so that the radial O-ring 16B in the groove 13s having a triangular cross-sectional shape has a predetermined compression amount via the O-ring pressing member 14B.

Furthermore, on the lower side of the O-ring holder 13B, a ring-shaped pressing lid 15B is disposed. The pressing lid 15B is provided to attach the O-ring holder 13B, the O-ring pressing member 14B, and the shim 18B together to the bottom tube sheet 11B by screwing bolts 17B (bolts with locking nuts) provided in the circumferential direction in threaded holes in the bottom tube sheet 11B. In this case, between the lower surface of the bottom tube sheet 11B and the upper surface of the pressing lid 15B, a space 15s for tightening the bolts 17B is formed.

By screwing the bolts 17B in the threaded holes in the bottom tube sheet 11B, the O-ring holder 13B is pressed against the bottom tube sheet 11B. Therefore, the planar O-ring 12B is pressed onto the bottom tube sheet 11B. Thereby, a fluidtight seal is provided between the second chamber (fluid chamber) 20 and the outside, and the radial O-ring 16B and the outer periphery of the cylindrical body 10 are pressed on each other, so that a fluidtight seal is provided between the first chamber (fluid passage) 30 of the cylindrical body 10 and the second chamber (fluid chamber) 20.

On the other hand, between an outer peripheral wall lit of the planar O-ring 12B of the O-ring holder 13B and the groove 11s in the bottom tube sheet 11B, a gap A, which is a parallel movement allowance of the O-ring holder 13B, is formed. Also, between the inner peripheral surface of the bottom tube sheet 11B and the outer peripheral surface of the cylindrical body 10, a gap B is formed.

Also, the diameter tolerance of the cylindrical body 10 can be accommodated by holding the shape of the groove 13s having a triangular cross-sectional shape so as to be the same according to the diameter tolerance of the cylindrical body 10 by the adjustment of the thickness of the shim 18B and by holding the predetermined compression amount of the radial O-ring 16B so as to be constant.

Figure 3A:
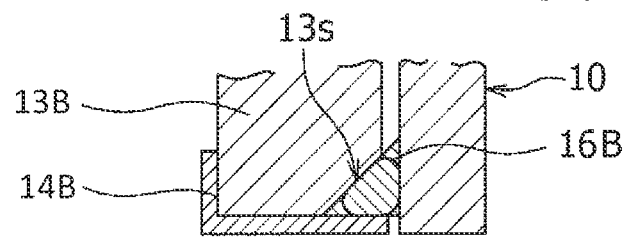
FIGS. 3(A) to 3(C) are sectional views showing the relationship between a groove having a triangular cross-sectional shape and a shim.
Figure 3B:
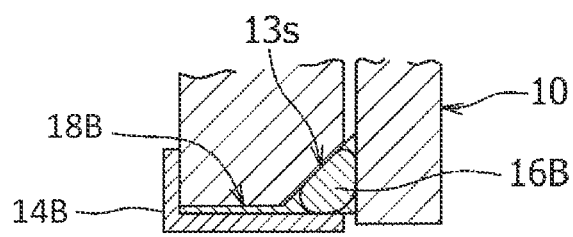
Figure 3C:
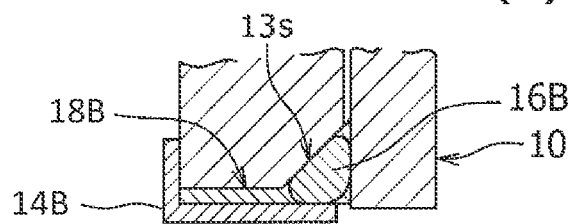
Figure 4:
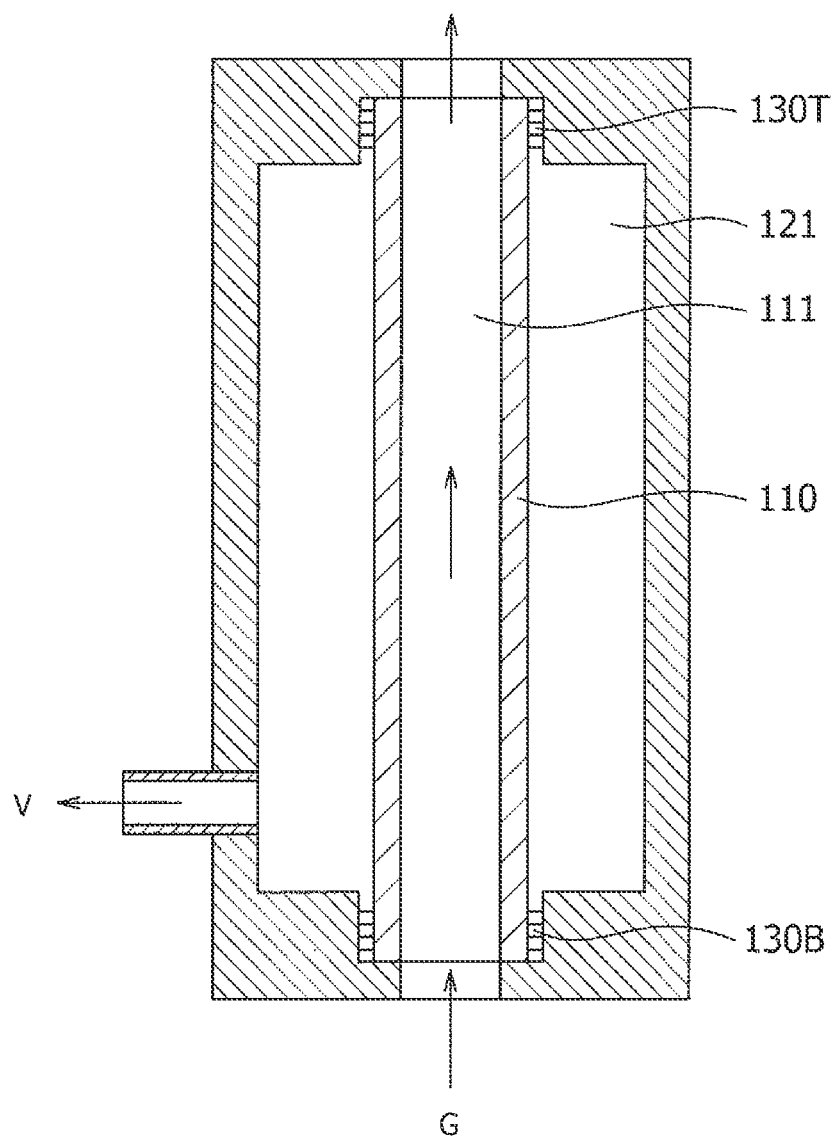
FIG. 4 is a sectional view showing a portion of a separation membrane of a conventional separation device.
Figure 6:
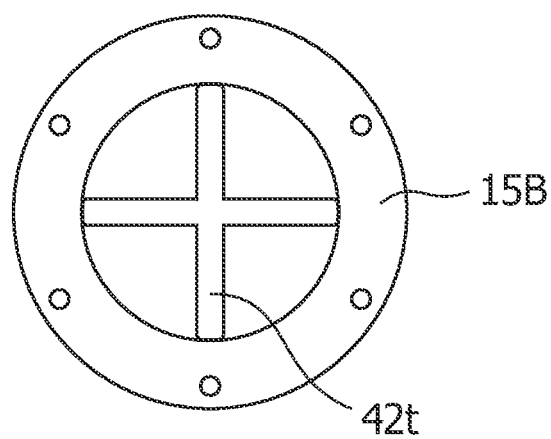
FIG. 6 is a plan view of a cross-shaped member in accordance with an embodiment of the present invention.

FIGS. 3(A) to 3(C) are sectional views showing the relationship between the groove 13s having a triangular cross-sectional shape and the shim 18B, showing a portion corresponding to a portion Y of FIG. 2.

FIG. 3(A) shows the case in which the diameter tolerance of the cylindrical body 10 is at a minimum. In this case, the thickness of the shim 18B is zero. FIG. 3(B) shows the case in which the diameter tolerance of the cylindrical body 10 is average. In this case, the shim 18B has some thickness. FIG. 3(C) shows the case in which the diameter tolerance of the cylindrical body 10 is at a maximum. In this case, the thickness of the shim 18B is larger than that in the above-described case.

That is to say, the thickness of the shim 18B is changed according to the diameter tolerance of the cylindrical body 10, by which the shape of the groove 13s having a triangular cross-sectional shape is always corrected, and the predetermined compression amount of the radial O-ring 16B is held so as to be constant. Thereby, the diameter tolerance of the cylindrical body 10 can be accommodated.

Also, in FIG. 2, at the inner periphery of the pressing lid 15B, a cross-shaped member 42t is fixed. The cross-shaped member 42t is brought into contact with the lower end of the cylindrical body 10, and in this state, the bolts 17B are tightened. Thereby, the cross-shaped member 42t comes into contact with the lower end of the cylindrical body 10, and the cylindrical body 10 is held. Also, a gap C is provided between the upper cross-shaped member 42t and the upper end of the cylindrical body 10 so that the tolerance in the lengthwise direction of the cylindrical body 10 can be accommodated.

As described above, according to the sealing structure in accordance with the embodiment of the present invention, for the cylindrical body 10 formed of an inorganic porous material or the like, the gap A that allows the O-ring holder 13B to move in the horizontal direction is formed between the outer peripheral wall 1it of the planar O-ring 12B of the O-ring holder 13B and the groove 11s in the bottom tube sheet 11B to accommodate the tolerance of not only diameter but also straightness (bending in the lengthwise direction). Therefore, when the device is assembled, the O-ring holder 13B can be moved freely in the horizontal direction in the gap A while the seal with the planar O-ring 12B is maintained. Thereby, the bending in the lengthwise direction of the cylindrical body 10 can be accommodated.

Also, the roundness tolerance of the cylindrical body 10 can be accommodated by the elasticity of the radial O-ring 16B that provides a seal in the axial line direction of the cylindrical body 10.

Furthermore, the tolerance in the lengthwise direction of the cylindrical body 10 can be accommodated because the gap C is provided.

Also, the diameter tolerance of the cylindrical body 10 is accommodated as described below. The groove 13s having a triangular cross-sectional shape is provided at the inner periphery of the O-ring holder 13B, and the radial O-ring 16B is incorporated in the groove 13s and is pressed by the O-ring pressing member 14B, by which a seal is provided between the O-ring holder 13B and the outer periphery of the cylindrical body 10. Furthermore, the shim 18B is provided between the lower part of the O-ring holder 13B and the O-ring pressing member 14B, and the configuration is made such that the thickness of the shim 18B is adjusted so that the radial O-ring 16B in the groove 13s having a triangular cross-sectional shape has the predetermined compression amount via the O-ring pressing member 14B. Therefore, the diameter tolerance of the cylindrical body 10 can be accommodated by correcting the shape of the groove 13s having a triangular cross-sectional shape according to the diameter tolerance of the cylindrical body 10 by the adjustment of the thickness of the shim 18B and by holding the predetermined compression amount of the radial O-ring 16B so as to be constant.

The above is a description of the embodiment of the present invention. The present invention is not limited to the above-described embodiment. Various modifications and changes can be made based on the technical concept of the present invention.

For example, in the above-described embodiment, two cylindrical bodies are arranged in the shell body 41. However, according to a separation device to be used, one cylindrical body 10 or three or more cylindrical bodies 10 can be disposed.

REFERENCE SYMBOLS LIST 10 cylindrical body
11B bottom tube sheet
11T top tube sheet
11s groove
12B, 12T planar O-ring
13B, 13T O-ring holder
13s groove having a triangular cross-sectional shape
14B, 14T O-ring pressing member
15B, 15T pressing lid
16B, 16T radial O-ring
17B, 17T bolt
18B, 18T shim
20 second chamber (fluid chamber)
30 first chamber (fluid passage)
41 shell body
41a, 41b flange
42 bottom chamber
43 top chamber
42t cross-shaped member
41s, 42s bolt
42a, 43a flange
A, B, C gap

The invention claimed is:

1. A sealing structure for a cylindrical body, comprising:
a fluid chamber provided in a shell body, wherein in a bottom portion and a top portion of the shell body, respective bottom and top flanges are provided, and on a bottom side of the bottom flange and on a top side of the top flange, respective tube sheets are provided;
the cylindrical body is arranged inside of the fluid chamber and provided in the shell body, both ends of the cylindrical body are sealed in a fluid tight manner;
a fluid passage formed in the cylindrical body;
an O-ring holder in which a planar O-ring that provides a seal in a radial direction of the cylindrical body and an O-ring that provides a seal in an axial direction of the cylindrical body are incorporated in an axial direction of the cylindrical body and are provided at the both ends of the cylindrical body; and
a tightening means for pressing the O-ring holder in the axial direction of the cylindrical body via a pressing lid, wherein
the O-ring holder is pressed against one of the tube sheets of the fluid chamber via the pressing lid by the tightening means to press the planar O-ring onto said one of the tube sheets, whereby a fluidtight seal is provided between the fluid chamber and the fluid passage inside the cylindrical body, and
the O-ring is pressed onto an outer periphery portion of the cylindrical body to provide a fluid tight seal between the fluid passage in the cylindrical body and the fluid chamber,
a gap formed between an outer peripheral wall of the planar O-ring of the O-ring holder and said one of the tube sheets, wherein
said gap is configured to enable the O-ring holder to move in a horizontal direction,
wherein a groove having a triangular shape is provided at an inner periphery of the O-ring holder, and the O-ring is incorporated in the groove and pressed by an O-ring pressing member, whereby a seal is provided between the O-ring holder and the outer periphery portion of the cylindrical body;
a shim member provided between the O-ring holder and the O-ring pressing member, said shim member configured in such a manner that the thickness of the shim member is adjustable so that the O-ring in the groove having a triangular shape has a predetermined compression amount via the O-ring pressing member, wherein a cross-shaped member is fixed to the pressing lid,
said cross-shaped member is brought into contact with a lower end of the cylindrical body, whereby
the cross-shaped member is configured so as to be brought into contact with the lower end part of the cylindrical body by the tightening means,
a gap is located between the cross-shaped member and an upper end of the cylindrical body.

* * * * *